United States Patent [19]

Arpin et al.

[11] Patent Number: 5,242,969
[45] Date of Patent: Sep. 7, 1993

[54] AQUEOUS POLYOLEFIN EMULSIONS AND METHOD OF FORMING SAME

[75] Inventors: Michel Arpin; Paul Petit, both of La Motte Servolex; Andre Vagnon, Chambery, all of France

[73] Assignee: Vetrotex-Saint Gobain, Coubertin, France

[21] Appl. No.: 758,442

[22] Filed: Sep. 5, 1991

Related U.S. Application Data

[63] Continuation of Ser. No. 511,478, Apr. 18, 1990, abandoned.

[30] Foreign Application Priority Data

Apr. 19, 1989 [FR] France ............................... 89 05187

[51] Int. Cl.$^5$ ............................................... C08K 3/20
[52] U.S. Cl. .................................. 524/458; 524/570; 524/582; 524/585
[58] Field of Search ................................ 524/773, 458

[56] References Cited

U.S. PATENT DOCUMENTS

| | | | |
|---|---|---|---|
| 3,655,353 | 4/1972 | Nalley et al. | 65/3 |
| 3,814,715 | 6/1974 | Nalley et al. | 260/29.6 |
| 4,240,944 | 12/1980 | Temple | 524/188 |
| 4,283,322 | 8/1981 | Temple | 260/29.6 |

FOREIGN PATENT DOCUMENTS

| | | |
|---|---|---|
| 0246729 | 11/1987 | European Pat. Off. . |
| 2044805 | 2/1971 | France . |
| 2448514 | 9/1980 | France . |
| 2588263 | 4/1987 | France . |
| 64-12581 | 6/1964 | Japan . |
| WO85/03511 | 8/1985 | PCT Int'l Appl. . |
| 70879 | 7/1981 | Romania . |

OTHER PUBLICATIONS

CA 98(4):17601t, Munteamu et al., 1983.

Primary Examiner—John C. Bleutge
Assistant Examiner—Mark D. Sweet
Attorney, Agent, or Firm—Pennie & Edmonds

[57] ABSTRACT

An aqueous emulsion for use in forming a sizing coating for treating a surface of a substrate. The emulsion comprises at least one polyolefin having a weight average molecular weight greater than 10,000; an acid material selected from the group consisting of saturated fatty acids, unsaturated fatty acids which do not includ any hydroxyl groups and mixtures thereof; at least one base; optionally, an emulsifying agent; and a sufficient amount of water to form an aqueous phase emulsion comprising from about 10-50% of solid materials. The emulsion is formed by combining the polyolefin with the fatty acid at a temperature higher than the melting point of the polyolefin to form a first mixture, adding to the first mixture a sufficient amount of base to neutralize the polyolefin and the fatty acid together with the water and optionally the emulsifying agent to form a second mixture; stirring the second mixture at an elevated pressure and at a temperature above the melting point of the polyolefin and subsequently cooling the mixture to a temperature below the melting point of the polyolefin. The emulsion is particularly useful as a component of a sizing for coating and protecting glass fibers for reinforcing polymeric materials.

8 Claims, No Drawings

AQUEOUS POLYOLEFIN EMULSIONS AND METHOD OF FORMING SAME

This is a continuation of application Ser. No. 07/511,478, filed Apr. 18, 1990, now abandoned.

FIELD OF THE INVENTION

This invention relates to aqueous phase emulsions comprising a base having at least one grafted polyolefin and a process for forming such emulsions. The invention also relates to the use of these emulsions as a component of a finish composition for use with, for example, glass fibers.

BACKGROUND OF THE INVENTION

Synthetic polymers are frequently combined with glass fibers to obtain a composite product whose properties, particularly the mechanical properties, are better than those available with the use of unreinforced polymer material. This is particularly true in the case of polyolefins.

When reinforcing polyolefins with glass fibers, it is known to treat the surface of the fibers with a finish comprising a polyolefin emulsion in the aqueous phase. This finish, in addition to protecting the surface of the glass fibers, which is one of the standard functions of this treatment, improves the adherence of the fibers to the material which they are to reinforce. To optimize the compatibility between the finish covering the fibers and the matrix to be reinforced, it also is known to use an emulsion having a polyolefin base of a nature close to that of the polyolefins constituting the matrix.

Emulsifying polyolefins is relatively easy as long as their weight average molecular weight is less than about 10,000. The polyolefin is simply melted while adding suitable emulsifying agents with stirring. An emulsion is then obtained by subsequently adding the necessary water. U.S. Pat. No. 3,655,353 to Nalley et al. describes an emulsion with a polypropylene base formed according to the process described above.

It is not as simple, however, to emulsify polyelfins when their weight average molecular weight is greater than about 10,000 since, in the molten state, the fluidity of such polyolefins quickly becomes insufficient to obtain an emulsion. Moreover, isotactic or syndiotactic polyolefins, which exhibit a strong tendency to crystallize during their cooling, are also difficult to emulsify. Because of this crystallization tendency, the polyolefins generally selected to be emulsified are atactic or amorphous polyolefins.

Several patents recommend techniques for reducing the problem of crystallization. For example, U.S. Pat. No. 4,240,944 to Temple discloses the emulsification of a mixture of an amorphous polypropylene and an isotactic polypropylene after first melting the mixture of these two polymers. The proportion of isotactic polypropylene in this mixture is less than or equal to 50%.

To obtain emulsions from isotactic polyolefins of high molecular weight, it also is known to dissolve them with heat in an organic solvent which is immiscible in water, with subsequent addition of the necessary water. Such a process is described, for example, in French patent No. 2 588 263. This process requires, however, the subsequent elimination of the solvent by extraction or by washing and drying.

SUMMARY OF THE INVENTION

An object of the present invention is thus the formulation of an emulsion comprising a base of grafted polyolefins having a weight average molecular weight greater than about 10,000 and the development of a process for preparing such an emulsion which overcomes the difficulties encountered in the prior art processes described above.

The invention has as a further object a process of preparing emulsions formed with amorphous polyolefins and essentially crystalline (isotactic or syndiotactic) polyolefins which does not employ an organic solvent.

The invention also has as its object the production of a finish composition containing the subject emulsion for coating glass fibers intended for use in reinforcing polyolefins.

These objects are attained by forming aqueous emulsions comprising: (1) a mixture containing at least one grafted polyolefin having a weight average molecular weight greater than about 10,000 and at least one saturated fatty acid and/or at least one unsaturated fatty acid which does not contain any hydroxyl groups, (2) at least one base, (3) the necessary water to obtain from 10 to 50% of solid materials, and, optionally, (4) an emulsifying agent.

The emulsion is obtained by mixing together the at least one grafted polyolefin and at least one saturated fatty acid and/or unsaturated fatty acid at a temperature higher than the melting point of the grafted polyolefin to form a first mixture; then by adding to the first mixture thus formed at least one inorganic or organic base, the water and, optionally, an emulsifying agent to form a second mixture. The materials are then stirred under pressure at a temperature higher than the melting point of the polyolefin and subsequently cooled to a temperature lower than this melting point to form the emulsion.

The process of the invention is particularly useful with grafted polyolefins whose molecular weight is high and/or whose structure is essentially crystalline.

The intimate mixing of the polyolefin(s) and fatty acid(s) by mechanical means as described herein unexpectedly makes it possible to considerably reduce the viscosity of the polyolefin component in the molten state. Thus, polyolefins having a weight average molecular weight greater than about 30,000 and which exhibit insufficient fluidity for emulsification in the molten state, can easily be emulsified by the process of the present invention.

DETAILED DESCRIPTION OF THE INVENTION

According to the present invention, therefore, mixtures having a viscosity low enough to obtain an aqueous phase emulsion comprise, per 100 parts by weight of polyolefin, 10 to 50 parts by weight and, preferably, 15 to 30 parts by weight of fatty acid. When the fatty acid content is less than about 10 parts by weight, the polyolefin does not become sufficiently fluidized to obtain an emulsion. Additionally, when the weight average molecular weight of the polyolefin is high, for example, greater than about 50,000, a fatty acid content of even 10 parts by weight may prove insufficient. For polyolefins having such high molecular weights, it is preferable to include at least 15 parts by weight of fatty acid.

For the very high molecular weight polyolefins, it may be necessary to introduce a large quantity of fatty acids. However, in many applications, the proportion of polyolefin in the emulsion should remain high, and it is therefore desirable that the fatty acid content not exceed 50 parts by weight.

The grafted polyolefins to which the invention applies are polymers of ethylene compounds comprising from 2 to about 6 carbon atoms, such as, for example, polyethylenes, polypropylenes, polybutenes, polyisobutylenes, etc. The preferred polyolefins for use with the invention are the polyethylenes and homopolymers and copolymers of the polypropylenes.

The grafted polyolefins used in the invention include, for example, polypropylenes grafted by acids or anhydrides such as maleic, acrylic or methacrylic acid or their anhydrides, or by oxiranes such as glycidyl acrylate or glycidyl methacrylate.

These polyolefins are mixed with saturated fatty acids such as stearic, lauric and myristic acids, or unsaturated fatty acids such as oleic or linoleic acids. However, all the unsaturated fatty acids are not usable in the invention. It has been observed in particular that ricinoleic acid, comprising a substituted hydroxyl group, does not allow the polyolefins to become sufficiently fluidized to form the emulsion.

Mixing of the grafted polyolefins and the fatty acids offers the advantage of fluidizing these polymers without splitting their macromolecular chains. This is important if the emulsion to be formed from such a mixture is subsequently to be included as part of the composition of a finish for glass fibers. Actually, when the material to be reinforced is a high molecular weight polyolefin, it is desirable to associate this material with glass fibers having a finish comprising an emulsion of a polyolefin whose macromolecular chain is of similar structure to that of the polyolefin to be reinforced. This imparts the best possible mechanical properties to the composite product thus formed.

Another advantage to associating the material to be reinforced with glass fibers having such a sizing is that in such a situation it is not necessary to eliminate the fatty acid after having fluidized the polyolefin, in contrast to some additives such as the organic solvents.

In a manner known in the art, the acid functions upon the grafted polyolefin are neutralized by a base, which can be organic or inorganic. Thus, the base present in the emulsion of the invention may be an alkaline or alkaline-earth metal hydroxide, ammonium hydroxide or an amine such as diethylethanolamine or dimethylaminopropanol. Moreover, the base which is selected should be added in an amount sufficient to also neutralize the acid function of the fatty acid.

Another advantage of the present invention is that the emulsion may be obtained without using an emulsifying agent, which role is played by the neutralized fatty acid. However, in some cases, to obtain a fine emulsion which is stable over time, it is useful to add a separate emulsifying agent in amounts up to 20% by weight of the solid material. The emulsifying agents which may be used in the invention include nonionic compounds, anionic compounds and cationic compounds, which are all well known to one skilled in the art.

The process for producing the aqueous emulsion according to the present invention comprises:
a) combining at least one grafted polyolefin with at least one saturated fatty acid and/or at least one unsaturated fatty acid which does not contain any hydroxyl groups, at a temperature higher than the melting point of the polyolefin to form a first mixture;
b) adding to the first mixture thus obtained at least one inorganic or organic base, an amount of water necessary to obtain from 10 to 50% of solid materials and, optionally, an emulsifying agent to form a second mixture; and
c) stirring the second mixture under pressure at a temperature higher than the melting point of the polyolefin and then cooling the mixture to a temperature lower than this melting point.

Aqueous emulsions of polyolefins, particularly of polypropylenes, are best suited for surface treatment of a number of substrates. This is particularly true in the case of emulsions formed according to the present invention, which can be used to impregnate or coat fibers, fabrics, films and materials as different as paper, wood, asbestos or metal. Use of these emulsions makes it possible to render a hydrophobic surface resistant to chemical products or impermeable to gases. They can also serve as demolding agents.

One preferred application of the emulsion of the invention is in the formulation of a finish composition which can be deposited on the surface of glass fibers to reinforce a polyolefin. This finish composition comprises, besides the emulsion formed according to the invention, a number of additional components well known to those skilled in the art. These components include coupling agents, usually silanes such as gamma-aminopropyltriethoxysilane and, optionally, cationic or nonionic lubricating agents, film-forming agents and antistatic agents. Additional additives may be included within the composition of such a finish depending upon its intended application.

As shown in the following examples, the finish compositions made from emulsions according to the invention comprise on the order of 2 to 15% by weight of the emulsion. The polyolefin-fatty acid mixtures were formed in a mixer at a high shearing rate at a temperature on the order of 170° C. The mixture obtained was subsequently cooled and then ground.

The ground mixture was introduced into a reactor with the various ingredients necessary for emulsifying the polyolefin component. In the examples provided below, an amount of deionized water necessary to obtain an emulsion at 25% by weight of solid materials was added. The reactor, having a spherical shape, was equipped at its base with a stirrer whose rate of rotation can reach 650 rpm. This reactor also was equipped with an emulsifier with a high shearing rate able to rotate up to 2,500 rpm.

The rate of stirring and the temperature of the mixture contained in the reactor were gradually increased. When a temperature of about 170° C. was reached, the emulsifier was started for about 45 minutes. As soon as the emulsifier was stopped, the mixture was quickly cooled with continued stirring. The emulsion was then drawn off at about 45° C.

In the following examples of emulsions obtained under these conditions, the molecular weight indicated for the polypropylene used was measured by the Gel Permeation Chromatography ("GPC") method, which is well known to one skilled in the art, in a trichlorobenzene solvent, from a standard using polypropylene with a well-defined molecular weight. The grain size distribution was measured with a Coulter Counter analyzer, Model TA2, equipped with a 30 micrometer probe.

EXAMPLES

The scope of the invention is further described in connection with the following examples which are set forth for purpose of illustration only and which are not to be construed as limiting the scope of the invention in any manner.

EXAMPLE 1

The polyolefin used was an ethylene-polypropylene isotactic copolymer with 3% by weight of ethylene, grafted by maleic anhydride. The polymer had a weight average molecular weight of 66,600. 100 parts by weight of this copolymer were mixed with 30 parts by weight of stearic acid.

The fluidized copolymer was introduced into the reactor in the presence of 12.7 parts by weight of a neutralization amine (i.e., dimethylaminopropanol), 7.1 parts by weight of a first nonionic emulsifying agent (oxyethylenated octylphenol with 9 moles of ethylene oxide) and 7.1 parts by weight of a second emulsifying agent which was also nonionic (oxyethylenated nonylphenol with 50 moles of ethylene oxide).

The average particle diameter of the emulsion obtained was 1.8 micrometers with 21% of the particles measured exhibiting a diameter greater than 2.5 micrometers.

EXAMPLE 2

The polyolefin used was the same as that used in example 1. The stearic acid was, however, replaced by lauric acid in the same proportions.

The fluidized polyolefin was neutralized by the addition of 10.2 parts by weight of dimethylamino-2-methyl-2-propanol-1. The same emulsifying agents, in the same respective proportions, were used as in example 1.

The average diameter of the particles of the emulsion obtained was 2.6 micrometers with 55% of the particles measured exhibiting a diameter greater than 2.5 micrometers.

EXAMPLE 3

The fluidized polyolefin was identical with that used in the preceding example. The same type and amount of neutralization amine was also used. The two emulsifying agents of examples 1 and 2 were replaced by 14.2 parts by weight of oxyethylenated nonylphenol with 100 moles of ethylene oxide.

The average particle diameter of the emulsion obtained was 2.4 micrometers with 49% of the particles measured exhibiting a diameter greater than 2.5 micrometers.

EXAMPLE 4

The polyolefin used was an ethylene-polypropylene isotactic copolymer with 2% by weight of ethylene, grafted by maleic anhydride. The weight average molecular weight of the polyolefin was 76,900. 100 parts by weight of this copolymer were mixed with 20 parts by weight of stearic acid.

The neutralization amine used was identical with that used in examples 2 and 3. It was added in an amount of 13 parts by weight. The emulsifying agents and amounts used were identical with those of examples 1 and 2.

The average diameter of the particles of the emulsion obtained was 20 micrometers with 97% of the particles measured exhibiting a diameter greater than 2.5 micrometers.

EXAMPLE 5

The various components used were identical to those used in example 4, the only difference being that the amount of stearic acid used was 30 parts by weight.

The average diameter of the particles of the emulsion obtained was 3.4 micrometers with 70% of the particles measured exhibiting a diameter greater than 2.5 micrometers.

EXAMPLE 6

The polyolefin was an isotactic homopolymer of polypropylene, grafted by maleic anhydride, having a weight average molecular weight of 71,200. 100 parts by weight of this homopolymer were mixed with 25 parts by weight of stearic acid.

The mixture was neutralized with 16.2 parts by weight of the amine used in example 2. 6.9 parts by weight of each of the emulsifying agents added in example 2 were also included.

The particles of the emulsion obtained exhibited an average diameter of 2 micrometers with 38% of the particles measured having a diameter greater than 2.5 micrometers.

EXAMPLE 7

All the ingredients used were identical with those included in example 6. Only the proportions of the components of the mixture were different.

10 parts by weight of stearic acid, 7.5 parts by weight of amine and 6 parts by weight of each emulsifying agent were combined with 100 parts by weight of homopolymer. The polymer was only able to be partially emulsified and the emulsion obtained was very coarse. The remainder of the polymer formed a suspension of crystallized irregular grains.

EXAMPLE 8

The ingredients used were identical to those described in example 6. They were added in the following proportions: 30 parts by weight of stearic acid, 12.7 parts by weight of amine and 7.1 parts by weight of each emulsifying agent. These materials were associated with 100 parts by weight of homopolymer.

The emulsion thus obtained was formed from particles whose average diameter was 2.5 micrometers. 50% of the particles measured exhibited a diameter greater than this value.

EXAMPLE 9

The polyolefin selected was an isotactic homopolymer of polypropylene, grafted by maleic anhydride, whose weight average molecular weight was 51,500. 100 parts by weight of this homopolymer were mixed with 20 parts by weight of stearic acid.

The mixture was neutralized with 12.1 parts by weight of the amine used in example 2. The two emulsifying agents of this example were each introduced at a rate of 3 parts by weight.

The average diameter of the particles of the emulsion was 1.7 micrometers with 21% of the particles measured exhibiting a diameter greater than 2.5 micrometers.

EXAMPLE 10

100 parts by weight of the polypropylene used in example 9 were mixed with 30 parts by weight of stearic acid The mixture was neutralized by 7.1 parts by weight of potash. No emulsifying agent was used.

The average diameter of the particles of the emulsion was 5.8 micrometers with 80% of the particles measured exhibiting a diameter greater than 2.5 micrometers.

EXAMPLE 11

The mixture tested was similar to that used in example 10. 100 parts by weight of the polypropylene of example 9 were mixed with 20 parts by weight of stearic acid. The neutralization base was diethylethanolamine introduced at a rate of 14.4 parts by weight.

As in example 10, the mixture did not contain an emulsifying agent.

The average diameter of the particles of the emulsion was 3.4 micrometers with 70% of the particles measured exhibiting a diameter greater than 2.5 micrometers.

EXAMPLE 12

The components of this mixture were identical in nature and in proportions with those of example 9, except for the fatty acid used which, in this case, was ricinoleic acid. 30 parts by weight of the ricinoleic acid were mixed with 100 parts by weight of polypropylene.

The polypropylene failed to emulsify despite a fatty acid content clearly greater than that of the stearic acid used in example 9. A suspension of irregular grains of crystallized polypropylene was collected at the output of the reactor.

The aqueous emulsions formed according to the invention may be advantageously incorporated into finishes to be deposited on the surface of glass fibers used to reinforce polyolefins. Moreover, emulsions produced according to the invention can be associated without difficulty with the standard components of finish compositions used with glass fibers. These compositions generally comprise, for example, a coupling agent which most often is a silane, preferably an aminosilane; a film-forming agent selected from polyesters, polyurethanes, acrylics, polyvinyl acetates and epoxy polymers; a lubricating agent, which is preferably nonionic or cationic; and other optional components such as a moistening agent, an antistatic agent and the like.

The particles of an emulsion formed according to the invention may comprise from about 2 to 15% by weight of the finish composition described above. The amount of finish deposited on the glass fibers is between about 0.1 and 5% and most preferably between 0.2 and 1.5%.

The finish composition comprising the emulsion according to the invention can be deposited on the glass fibers by any means known to one skilled in the art. It can be deposited either at the time of the formation of the glass fibers or at a later stage. The thus treated glass fibers may be added to the polyolefins in a variety of forms, i.e., as roving or continuous fibers, mats formed from staple fibers or continuous fibers, a web, etc. to reinforce these materials.

By way of a comparative example, two finish compositions were prepared. The first finish, which serves as a reference, comprises an emulsion known as PPRL 3974, marketed by the Proctor Chemical Company. It is a polypropylene emulsion whose weight average molecular weight is less than 10,000.

This finish composition comprises the following components, with the contents being expressed in percentages by weight relative to the total weight of dry materials:

1% of gamma-aminopropyltriethoxysilane,
6% of the PPRL 3974 emulsion.

The second finish composition comprises the following components, according to the contents expressed as above:

1% of gamma-aminopropyltriethoxysilane,
6% of the emulsion produced according to Example 1.

These finishes were deposited on glass fibers having an average diameter of 13 micrometers. The losses due to ignition of yarns formed from fibers thus treated are about 0.8%. These yarns were used in the form of staple fibers to reinforce, at a rate of 30% by weight of glass, two materials with a polyolefin base.

The first material to be reinforced consisted of a polypropylene marketed by the Appryl Company under the name APPRYL 3030 P.

The second material consisted of the polypropylene used in the first material to which has been added 1% by weight of an isotactic polypropylene marketed by the Himont Company under the name HERCOPRIME G.

The measured values of various mechanical properties of these reinforced materials are given in the Table below. The tensile strength, bending stresses at rupture and the resistances to the CHARPY and IZOD impact were measured under conditions respectively defined by the AFNOR NFT 57101, AFNOR NFT 51001, AFNOR NFT 51035 and ISO R 180 standards, which are well known among those of ordinary skill in the art.

TABLE

| | Material 1 (APPRYL 3030 P) | | Material 2 (APPRYL 3030 P + 1% HERCOPRIME G) | |
|---|---|---|---|---|
| | Reference Finish | Finish According to the Invention | Reference Finish | Finish According to the Invention |
| Tensile Stress at Rupture (Mpa) | 65 | 76 | 80 | 90 |
| Bending Stress at Rupture (Mpa) | 95 | 110 | 120 | 130 |
| Unnotched Charpy Impact (KJ/m²) | 15 | 19 | 25 | 33 |
| Notched Izod Impact (J/m) | 90 | 120 | 110 | 140 |

We claim:
1. A process for forming an aqueous emulsion which comprises:
   a) intimately mixing at least one polyolefin having an initial viscosity value and a weight average molecular weight greater than about 10,000 with an acid material selected from the group consisting of saturated fatty acids, unsaturated fatty acids and mixtures thereof, wherein said unsaturated fatty acids do not include any hydroxyl groups, at a temperature higher than the melting point of said at least one polyolefin to form a first mixture wherein the viscosity of said at least one polyolefin is considerably reduced from said initial value;

b) adding to said first mixture a sufficient amount of a base to neutralize said at least one polyolefin and said acid material and an amount of water sufficient to form a second mixture comprising from about 10 to about 50% by weight of solid material;

c) stirring said second mixture under pressure at a temperature above the melting point of said polyolefin; and d) cooling said stirred second mixture to a temperature below said melting point to form said aqueous emulsion.

2. The process of claim 1 which further comprises adding an emulsifying agent to said second mixture to facilitate formation of said emulsion.

3. The process of claim 1 wherein said first mixture is formed by mixing said at least one polyolefin and said acid material at a high shearing rate at a temperature of at least about 170° C.

4. A process for forming an aqueous emulsion which comprises:

a) intimately mixing at least one essentially crystalline pololefin, having an initial viscosity value and a weight average molecular weight greater than about 10,000 with an acid material selected from the group consisting of saturated fatty acids, unsaturated fatty acids and mixtures thereof, wherein said unsaturated fatty acids do not include any hydroxyl groups, at a temperature higher than the melting point of said at least one polyolefin to form a first mixture wherein the viscosity of said at least one polyolefin is considerably reduced from said initial value;

b) adding to said first mixture a sufficient amount of a base to neutralize said at least one polyolefin and said acid material and an amount of water sufficient to form a second mixture comprising from about 10 to about 50% by weight of solid material;

c) stirring said second mixture under pressure at a temperature above the melting point of said polyolefin, and d) cooling said stirred second mixture to a temperature below said melting point to form said aqueous emulsion.

5. The process of claim 1 which comprises mixing up to about 100 parts by weight of said polyolefin with said acid material to form said first mixture.

6. The process of claim 5 which comprises mixing from about 10 to about 50 parts by weight of said acid material per 100 parts by weight of said polyolefin to form said first mixture.

7. The process of claim 6 which comprises mixing from about 15 to about 30 parts by weight of said acid material per 100 parts by weight of said polyolefin to form said first mixture.

8. The process of claim 2 which comprises adding said emulsifying agent to said second mixture in an amount of up to about 20% by weight of solid material.

* * * * *